United States Patent
Schellekens et al.

(10) Patent No.: US 11,267,173 B2
(45) Date of Patent: Mar. 8, 2022

(54) MOLDING OF PLASTIC GLAZING OF TAILGATES

(71) Applicant: SABIC Global Technologies B.V., Bergen op Zoom (NL)

(72) Inventors: Geert Jan Schellekens, Glize (NL); Matteo Terragni, Misinto (IT)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 204 days.

(21) Appl. No.: 15/756,627

(22) PCT Filed: Sep. 7, 2016

(86) PCT No.: PCT/IB2016/055334
§ 371 (c)(1),
(2) Date: Mar. 1, 2018

(87) PCT Pub. No.: WO2017/042699
PCT Pub. Date: Mar. 16, 2017

(65) Prior Publication Data
US 2018/0236699 A1    Aug. 23, 2018

Related U.S. Application Data

(60) Provisional application No. 62/215,084, filed on Sep. 7, 2015.

(51) Int. Cl.
*B29C 45/16* (2006.01)
*F21S 43/20* (2018.01)
(Continued)

(52) U.S. Cl.
CPC .......... *B29C 45/16* (2013.01); *B29C 45/0001* (2013.01); *B60J 5/0481* (2013.01);
(Continued)

(58) Field of Classification Search
None
See application file for complete search history.

(56) References Cited

U.S. PATENT DOCUMENTS 4,551,484 A    11/1985   Radisch et al.
4,558,634 A    12/1985   Oshiro et al.
(Continued)

FOREIGN PATENT DOCUMENTS

CA    2762401 A    6/2012
CN    1668461 A    9/2005
(Continued)

OTHER PUBLICATIONS

U.S. Appl. No. 61/935,718, filed Feb. 4, 2014.
(Continued)

*Primary Examiner* — Matthew J Daniels
*Assistant Examiner* — Paul Spiel

(57) ABSTRACT

A method of manufacturing a plastic glazing of a tailgate of a vehicle, the method comprising: injecting a first material into a molding apparatus to form a first component of the plastic glazing, wherein the first component comprises a panel of the plastic glazing; injecting a second material into the molding apparatus to form a second component of the plastic glazing, wherein the second component combines with at least the first component, wherein at least a portion of the first component and the second component comprises a transparent cover of a molded light assembly; and injecting a third material into the molding apparatus to form a third component, wherein the third component combines with at least the first component.

9 Claims, 9 Drawing Sheets

(51) Int. Cl.
  *B60Q 1/30* (2006.01)
  *B29K 69/00* (2006.01)
  *B62D 29/04* (2006.01)
  *B60J 5/04* (2006.01)
  *B60J 5/10* (2006.01)
  *B60Q 1/00* (2006.01)
  *B60Q 1/26* (2006.01)
  *B29C 45/00* (2006.01)
  *B29L 31/30* (2006.01)
  *B29K 101/12* (2006.01)
  *B29L 31/00* (2006.01)

(52) U.S. Cl.
  CPC ............ *B60J 5/107* (2013.01); *B60Q 1/0035* (2013.01); *B60Q 1/26* (2013.01); *B60Q 1/2607* (2013.01); *B60Q 1/302* (2013.01); *B62D 29/043* (2013.01); *F21S 43/26* (2018.01); *B29K 2069/00* (2013.01); *B29K 2101/12* (2013.01); *B29K 2995/0025* (2013.01); *B29K 2995/0026* (2013.01); *B29K 2995/0029* (2013.01); *B29L 2031/3005* (2013.01); *B29L 2031/3052* (2013.01); *B29L 2031/747* (2013.01); *B60J 5/10* (2013.01); *B60Q 1/30* (2013.01)

(56) References Cited

U.S. PATENT DOCUMENTS

| | | |
|---|---|---|
| 4,609,688 A | 9/1986 | Radisch et al. |
| 4,636,698 A | 1/1987 | Leclercq |
| 4,645,970 A | 2/1987 | Murphy |
| 4,712,287 A | 12/1987 | Johnston |
| 4,765,672 A | 8/1988 | Weaver |
| 4,775,402 A | 10/1988 | Letemps et al. |
| 4,778,366 A | 10/1988 | Weaver |
| 4,792,425 A | 12/1988 | Weaver |
| 4,871,385 A | 10/1989 | Lecourt et al. |
| 4,888,072 A | 12/1989 | Ohlenforst et al. |
| 5,060,440 A | 10/1991 | Weaver |
| 5,071,709 A | 12/1991 | Berquier et al. |
| 5,324,374 A | 6/1994 | Harmand et al. |
| 5,443,862 A | 8/1995 | Buffat et al. |
| 5,451,090 A | 9/1995 | Brodie et al. |
| 5,495,400 A | 2/1996 | Currie |
| 5,505,023 A | 4/1996 | Gillen et al. |
| 5,508,585 A | 4/1996 | Butt |
| 5,637,363 A | 6/1997 | Leray et al. |
| 5,669,693 A | 9/1997 | Smith |
| 5,726,953 A | 3/1998 | Lapointe et al. |
| 5,757,127 A | 5/1998 | Inoguchi et al. |
| 5,772,304 A | 6/1998 | Smith |
| 5,776,603 A | 7/1998 | Zagdoun et al. |
| 5,780,965 A | 7/1998 | Cass et al. |
| 5,807,515 A | 9/1998 | Fisher et al. |
| 5,857,770 A | 1/1999 | Fohl et al. |
| 5,887,393 A | 3/1999 | Vanark et al. |
| 5,890,796 A | 4/1999 | Marinelli et al. |
| 5,965,981 A | 10/1999 | Inoguchi et al. |
| 6,054,189 A | 4/2000 | Bravet et al. |
| 6,106,931 A | 8/2000 | Ito et al. |
| 6,224,135 B1 | 5/2001 | Rehkopf |
| 6,241,302 B1 | 6/2001 | Rehkopf |
| 6,432,332 B1 | 8/2002 | Matsco et al. |
| 6,461,028 B1 | 10/2002 | Huang |
| 6,468,677 B1 | 10/2002 | Benton et al. |
| 6,536,930 B1 | 3/2003 | Hirmer |
| 6,585,402 B2 | 7/2003 | Ohkodo et al. |
| 6,627,319 B2 | 9/2003 | Jacquiod et al. |
| 6,660,968 B1 | 12/2003 | Mottelet et al. |
| 6,747,779 B1 | 6/2004 | Morin et al. |
| 6,811,857 B1 | 11/2004 | Bravet et al. |
| 6,811,895 B2 | 11/2004 | Murasko et al. |
| 6,852,393 B2 | 2/2005 | Gandon |
| 6,872,453 B2 | 3/2005 | Arnaud et al. |
| 6,908,204 B2 | 6/2005 | Kraft |
| 6,965,196 B2 | 11/2005 | Murasko et al. |
| 7,012,728 B2 | 3/2006 | Morin et al. |
| 7,018,057 B2 | 3/2006 | Richard |
| 7,024,822 B2 | 4/2006 | Scheer et al. |
| 7,025,482 B2 | 4/2006 | Yamashita et al. |
| 7,026,577 B2 | 4/2006 | Maeuser et al. |
| 7,048,400 B2 | 5/2006 | Murasko et al. |
| 7,048,422 B1 | 5/2006 | Solomon |
| 7,048,423 B2 | 5/2006 | Stepanenko et al. |
| 7,100,328 B2 | 9/2006 | Scheer et al. |
| 7,144,289 B2 | 12/2006 | Murasko et al. |
| 7,172,322 B2 | 2/2007 | Pommeret et al. |
| 7,265,889 B2 | 9/2007 | Morin et al. |
| 7,270,863 B2 | 9/2007 | Harima et al. |
| 7,290,906 B2 | 11/2007 | Suzuki et al. |
| 7,311,976 B2 | 12/2007 | Arnaud et al. |
| 7,318,663 B2 | 1/2008 | Verbrugh et al. |
| 7,469,450 B2 | 12/2008 | Gipson |
| 7,500,774 B2 | 3/2009 | Nishiyama et al. |
| 7,553,536 B1 | 6/2009 | Naoumenko et al. |
| 7,584,689 B2 | 9/2009 | Jones et al. |
| 7,654,721 B2 | 2/2010 | Okada |
| 7,686,489 B2 | 3/2010 | Ajiki et al. |
| 7,712,933 B2 | 5/2010 | Fleischmann et al. |
| 7,745,018 B2 | 6/2010 | Murasko et al. |
| 7,793,580 B2 | 9/2010 | Jones et al. |
| 7,806,538 B2 | 10/2010 | Ajiki et al. |
| 7,815,345 B2 | 10/2010 | Misawa et al. |
| 7,857,495 B2 | 12/2010 | Misawa et al. |
| 7,883,249 B2 | 2/2011 | Totani et al. |
| 7,892,661 B2 | 2/2011 | Boire et al. |
| 7,922,374 B2 | 4/2011 | Schwab et al. |
| 7,929,194 B2 | 4/2011 | Legois et al. |
| 7,985,011 B2 | 7/2011 | Ajiki et al. |
| 8,007,152 B2 | 8/2011 | Nakabayashi |
| 8,025,004 B2 | 9/2011 | Jones et al. |
| 8,044,415 B2 | 10/2011 | Messere et al. |
| 8,057,615 B2 | 11/2011 | Grussaute-Nghiem et al. |
| 8,083,388 B2 | 12/2011 | Sun et al. |
| 8,179,034 B2 | 5/2012 | Potts et al. |
| 8,226,282 B2 | 7/2012 | Kazaoka et al. |
| 8,297,168 B2 | 10/2012 | Jones et al. |
| 8,298,032 B2 | 10/2012 | Potts et al. |
| 8,303,147 B2 | 11/2012 | Jeon |
| 8,314,546 B2 | 11/2012 | Tchakarov |
| 8,317,381 B2 | 11/2012 | Heidinger |
| 8,339,040 B2 | 12/2012 | Bruton et al. |
| 8,349,445 B2 | 1/2013 | Jacquiod et al. |
| 8,384,520 B2 | 2/2013 | Fourreau |
| 8,403,399 B2 | 3/2013 | Kuntze et al. |
| 8,408,773 B2 | 4/2013 | Judge |
| 8,471,177 B2 | 6/2013 | Chaussade et al. |
| 8,550,536 B2 | 10/2013 | Gachter et al. |
| 8,585,263 B2 | 11/2013 | Shipman |
| 8,622,458 B2 | 1/2014 | Hache |
| 8,641,257 B2 | 2/2014 | Richardson |
| 8,646,829 B2 | 2/2014 | Crane et al. |
| 8,690,220 B2 | 4/2014 | Tsukiyama et al. |
| 8,697,186 B2 | 4/2014 | Zagdoun et al. |
| 8,727,422 B2 | 5/2014 | Iwabuchi et al. |
| 8,808,790 B2 | 8/2014 | Zagdoun et al. |
| 8,829,539 B2 | 9/2014 | Kleo et al. |
| 9,006,751 B2 | 4/2015 | Kleo et al. |
| 9,090,120 B2 | 7/2015 | Pires et al. |
| 9,210,771 B2 | 12/2015 | Day |
| 9,637,184 B1 | 5/2017 | Bennett et al. |
| 9,821,862 B2 | 11/2017 | Han et al. |
| 9,902,437 B2 | 2/2018 | Demange et al. |
| 2002/0037421 A1 | 3/2002 | Arnaud et al. |
| 2004/0005472 A1 | 1/2004 | Arnaud et al. |
| 2004/0191618 A1 | 9/2004 | Morin et al. |
| 2004/0218400 A1 | 11/2004 | Egashira |
| 2004/0265512 A1 | 12/2004 | Aengenheyster et al. |
| 2005/0045613 A1 | 3/2005 | Maeuser et al. |
| 2005/0147825 A1 | 7/2005 | Arnaud et al. |
| 2005/0168013 A1 | 8/2005 | Rinklin |
| 2005/0242721 A1 | 11/2005 | Foust et al. |

(56) References Cited

U.S. PATENT DOCUMENTS

| | | |
|---|---|---|
| 2006/0005484 A1 | 1/2006 | Riblier et al. |
| 2006/0033978 A1 | 2/2006 | Morin et al. |
| 2006/0209551 A1 | 9/2006 | Schwenke et al. |
| 2006/0210772 A1 | 9/2006 | Bui et al. |
| 2006/0210778 A1 | 9/2006 | Benyahia et al. |
| 2007/0026235 A1 | 2/2007 | Chen et al. |
| 2007/0068375 A1 | 3/2007 | Jones et al. |
| 2007/0068376 A1 | 3/2007 | Jones et al. |
| 2007/0157671 A1 | 7/2007 | Thellier et al. |
| 2008/0241523 A1 | 10/2008 | Huignard et al. |
| 2008/0254299 A1 | 10/2008 | Blackburn et al. |
| 2008/0264930 A1 | 10/2008 | Mennechez et al. |
| 2009/0110918 A1 | 4/2009 | Jacquiod et al. |
| 2009/0308239 A1 | 12/2009 | Jones et al. |
| 2010/0026045 A1 | 2/2010 | Thomas |
| 2010/0061093 A1 | 3/2010 | Janssen et al. |
| 2010/0288117 A1 | 11/2010 | Jones et al. |
| 2011/0033667 A1 | 2/2011 | Leconte et al. |
| 2011/0061302 A1 | 3/2011 | Barral et al. |
| 2011/0240343 A1 | 10/2011 | Zagdoun et al. |
| 2011/0241376 A1 | 10/2011 | Igura |
| 2011/0248219 A1 | 10/2011 | Zagdoun et al. |
| 2011/0250387 A1 | 10/2011 | Zagdoun et al. |
| 2012/0001027 A1 | 1/2012 | Jones et al. |
| 2012/0153670 A1 | 6/2012 | Crane et al. |
| 2012/0229907 A1 | 9/2012 | Ueda |
| 2012/0248814 A1 | 10/2012 | Tsukiyama et al. |
| 2012/0280533 A1 | 11/2012 | Gachter et al. |
| 2012/0320621 A1 | 12/2012 | Kleo et al. |
| 2013/0033894 A1 | 2/2013 | Kleo et al. |
| 2013/0051049 A1 | 2/2013 | Sato |
| 2013/0135885 A1 | 5/2013 | Anzai |
| 2013/0182451 A1 | 7/2013 | Oba et al. |
| 2013/0201709 A1 | 8/2013 | Natsume |
| 2013/0280452 A1* | 10/2013 | Nawroth .......... B60J 5/107 428/35.7 |
| 2013/0293105 A1 | 11/2013 | Day |
| 2013/0313601 A1 | 11/2013 | Aeling et al. |
| 2013/0314935 A1 | 11/2013 | Tokieda et al. |
| 2014/0003076 A1 | 1/2014 | Suganumata et al. |
| 2014/0077525 A1 | 3/2014 | Yoshimura et al. |
| 2014/0110964 A1 | 4/2014 | Schijve et al. |
| 2014/0327269 A1* | 11/2014 | Agius .......... B29C 45/164 296/191 |
| 2015/0084370 A1 | 3/2015 | Newberry et al. |
| 2015/0153014 A1* | 6/2015 | Salter .......... F21V 29/70 362/510 |
| 2015/0274066 A1 | 10/2015 | Del Polo Gonzalez et al. |
| 2015/0274223 A1 | 10/2015 | Wolf et al. |
| 2017/0301981 A1 | 10/2017 | Niihara et al. |
| 2018/0050741 A1 | 2/2018 | Wolf et al. |
| 2018/0112847 A1 | 4/2018 | Childress et al. |
| 2018/0186220 A1 | 7/2018 | Leterrier et al. |
| 2018/0236699 A1 | 8/2018 | Schellekens et al. |
| 2018/0244136 A1 | 8/2018 | Schellekens et al. |
| 2018/0251166 A1 | 9/2018 | Escoffier et al. |
| 2018/0252382 A1 | 9/2018 | Schellekens et al. |

FOREIGN PATENT DOCUMENTS

| | | |
|---|---|---|
| CN | 1945103 A | 4/2007 |
| CN | 101130292 A | 2/2008 |
| CN | 201566450 U | 9/2010 |
| CN | 102245431 A | 11/2011 |
| CN | 103477252 A | 12/2013 |
| CN | 102458890 B | 5/2014 |
| CN | 103772921 A | 5/2014 |
| CN | 203655050 U | 6/2014 |
| CN | 203713981 U | 7/2014 |
| CN | 203844852 U | 9/2014 |
| CN | 104943603 A | 9/2015 |
| DE | 19706043 A1 | 6/1998 |
| DE | 69617705 T2 | 8/2002 |
| DE | 10147537 A1 | 4/2003 |
| DE | 69530806 T2 | 4/2004 |
| DE | 69929597 T2 | 9/2006 |
| DE | 60025815 T2 | 11/2006 |
| DE | 60027335 T2 | 1/2007 |
| DE | 60219518 T2 | 1/2008 |
| DE | 102008004942 | 6/2009 |
| DE | 102009058788 A1 | 6/2011 |
| DE | 202011110333 U1 | 8/2013 |
| EP | 0266514 A2 | 5/1988 |
| EP | 0267331 A1 | 5/1988 |
| EP | 0235447 B1 | 2/1994 |
| EP | 0453092 B1 | 8/1994 |
| EP | 0671864 A2 | 9/1995 |
| EP | 1000809 A1 | 5/2000 |
| EP | 1437215 A1 | 7/2004 |
| EP | 1494062 A2 | 1/2005 |
| EP | 1787841 A2 | 5/2007 |
| EP | 1892182 A1 | 2/2008 |
| EP | 1950492 A1 | 7/2008 |
| EP | 1992478 A1 | 11/2008 |
| EP | 2005226 A1 | 12/2008 |
| EP | 1261557 B1 | 11/2009 |
| EP | 2219862 A1 | 8/2010 |
| EP | 2275770 A1 | 1/2011 |
| EP | 2275771 A1 | 1/2011 |
| EP | 2275772 A1 | 1/2011 |
| EP | 2287557 A1 | 2/2011 |
| EP | 1824696 B1 | 1/2012 |
| EP | 2574142 A1 | 3/2013 |
| EP | 1897412 B1 | 12/2013 |
| FR | 2792628 A1 | 10/2000 |
| FR | 2863210 A1 | 6/2005 |
| FR | 2874995 A | 3/2006 |
| FR | 2884148 B1 | 9/2007 |
| FR | 2961151 B1 | 6/2012 |
| FR | 2968631 A1 | 6/2012 |
| FR | 2996803 A1 | 4/2014 |
| GB | 1329505 A | 9/1973 |
| GB | 1480193 A | 7/1977 |
| GB | 2442364 A | 4/2008 |
| GB | 2513620 A | 11/2014 |
| JP | H08-050933 A | 2/1996 |
| JP | H08-207204 A | 8/1996 |
| JP | 2584764 B2 | 2/1997 |
| JP | H10-036706 A | 2/1998 |
| JP | H10-180183 A | 7/1998 |
| JP | 10-329165 A | 12/1998 |
| JP | 2000-233951 A | 8/2000 |
| JP | 2000-301985 A | 10/2000 |
| JP | 2002-518207 A | 6/2002 |
| JP | 2002-533233 A | 10/2002 |
| JP | 2002-543027 A | 12/2002 |
| JP | 2003-513840 A | 4/2003 |
| JP | 3445860 B2 | 9/2003 |
| JP | 2003-529462 A | 10/2003 |
| JP | 2004-534667 A | 11/2004 |
| JP | 2005-511473 A | 4/2005 |
| JP | 3741461 B2 | 2/2006 |
| JP | 3961583 B2 | 8/2007 |
| JP | 2008-528329 A | 7/2008 |
| JP | 2008-543706 A | 12/2008 |
| JP | 2008-545465 A | 12/2008 |
| JP | 2009-500271 A | 1/2009 |
| JP | 2009-512977 A | 3/2009 |
| JP | 4242743 B2 | 3/2009 |
| JP | 4251678 B2 | 4/2009 |
| JP | 4440641 B2 | 3/2010 |
| JP | 2010-188792 A | 9/2010 |
| JP | 2010-247676 A | 11/2010 |
| JP | 2010-260519 A | 11/2010 |
| JP | 2011-051544 A | 3/2011 |
| JP | 2011-057188 A | 3/2011 |
| JP | 2011-514849 A | 5/2011 |
| JP | 2011-121479 A | 6/2011 |
| JP | 2011-126388 A | 6/2011 |
| JP | 4700804 B2 | 6/2011 |
| JP | 2011-136606 A | 7/2011 |
| JP | 4754044 B2 | 8/2011 |
| JP | 4771262 B2 | 9/2011 |

(56) References Cited

FOREIGN PATENT DOCUMENTS

| | | |
|---|---|---|
| JP | 2011-219000 A | 11/2011 |
| JP | 2012-030654 A | 2/2012 |
| JP | 2012-503716 A | 2/2012 |
| JP | 2012-503852 A | 2/2012 |
| JP | 2012-046109 A | 3/2012 |
| JP | 2012-061957 A | 3/2012 |
| JP | 2012-131375 A | 7/2012 |
| JP | 5015764 B2 | 8/2012 |
| JP | 2012-206612 A | 10/2012 |
| JP | 2012-206614 A | 10/2012 |
| JP | 5054376 B2 | 10/2012 |
| JP | 5107242 B2 | 12/2012 |
| JP | 2013-006570 A | 1/2013 |
| JP | 5128733 B2 | 1/2013 |
| JP | 2013-056669 A | 3/2013 |
| JP | 5160900 B2 | 3/2013 |
| JP | 2013-517989 A | 5/2013 |
| JP | 2013-517990 A | 5/2013 |
| JP | 2013-124006 A | 6/2013 |
| JP | 5235658 B2 | 7/2013 |
| JP | 5243447 B2 | 7/2013 |
| JP | 2013-230716 A | 11/2013 |
| JP | 2013-230717 A | 11/2013 |
| JP | 2013-230723 A | 11/2013 |
| JP | 5479732 B2 | 4/2014 |
| JP | 2014-076707 A | 5/2014 |
| JP | 2014-091342 A | 5/2014 |
| JP | 2014-101055 A | 6/2014 |
| JP | 2014-104790 A | 6/2014 |
| JP | 2014-159243 A | 9/2014 |
| KR | 2008-0034314 A | 4/2008 |
| WO | WO 1987/003846 A1 | 7/1987 |
| WO | WO 1994/022779 A2 | 10/1994 |
| WO | WO 1998/047703 A1 | 10/1998 |
| WO | WO 1999/003678 A1 | 1/1999 |
| WO | WO 1999/065678 A1 | 12/1999 |
| WO | WO 2000/037374 A1 | 6/2000 |
| WO | WO 2000/057243 A1 | 9/2000 |
| WO | WO 2000/067530 A1 | 11/2000 |
| WO | WO 2001/026924 A1 | 4/2001 |
| WO | WO 2002/002472 A1 | 1/2002 |
| WO | WO 2002/072330 A1 | 9/2002 |
| WO | WO 2003/010105 A1 | 2/2003 |
| WO | WO 2003/026869 A1 | 4/2003 |
| WO | WO 2006/030165 A1 | 3/2006 |
| WO | WO 2006/091959 A2 | 8/2006 |
| WO | WO 2006/095005 A1 | 9/2006 |
| WO | WO 2006/135832 A2 | 12/2006 |
| WO | WO 2007/003849 A2 | 1/2007 |
| WO | WO 2007/003849 A3 | 1/2007 |
| WO | WO 2007/119019 A1 | 10/2007 |
| WO | WO 2008/104728 A2 | 9/2008 |
| WO | WO 2008/132397 A2 | 11/2008 |
| WO | WO 2009/074266 A1 | 6/2009 |
| WO | WO 2010/034944 A1 | 4/2010 |
| WO | WO 2010/034945 A1 | 4/2010 |
| WO | WO 2010/034949 A1 | 4/2010 |
| WO | WO 2010/034950 A1 | 4/2010 |
| WO | WO 2010/049638 A1 | 5/2010 |
| WO | WO 2009/056775 A2 | 8/2010 |
| WO | WO 2011/092419 A1 | 4/2011 |
| WO | WO 2011/092420 A2 | 4/2011 |
| WO | WO 2011/092421 A1 | 4/2011 |
| WO | WO 2011/054826 A1 | 5/2011 |
| WO | WO 2011/067541 A1 | 6/2011 |
| WO | WO 2011/157911 A1 | 12/2011 |
| WO | WO 2012/055873 A2 | 5/2012 |
| WO | WO 2012/055873 A3 | 5/2012 |
| WO | WO 2012/080621 A1 | 6/2012 |
| WO | WO 2012/085433 A1 | 6/2012 |
| WO | WO 2012/098330 A1 | 7/2012 |
| WO | WO 2012/104530 A1 | 8/2012 |
| WO | WO 2012/126708 A1 | 9/2012 |
| WO | WO 2012/168009 A1 | 12/2012 |
| WO | WO 2012/168628 A1 | 12/2012 |
| WO | WO 2012/168646 A1 | 12/2012 |
| WO | WO 2013/017790 A1 | 2/2013 |
| WO | WO 2013/017791 A1 | 2/2013 |
| WO | WO 2013/017792 A1 | 2/2013 |
| WO | WO 2013/054059 A1 | 4/2013 |
| WO | WO 2013/068678 A1 | 5/2013 |
| WO | WO 2013/068679 A1 | 5/2013 |
| WO | WO 2013/079832 A1 | 6/2013 |
| WO | WO 2013/087518 A1 | 6/2013 |
| WO | WO 2013/093301 A1 | 6/2013 |
| WO | WO 2013/110885 A1 | 8/2013 |
| WO | WO 2013/121134 A1 | 8/2013 |
| WO | WO 2013/153303 A1 | 10/2013 |
| WO | WO 2013/167832 A1 | 11/2013 |
| WO | WO 2014/009630 A1 | 1/2014 |
| WO | WO 2014/020249 A1 | 2/2014 |
| WO | WO 2014/037643 A1 | 3/2014 |
| WO | WO 2014/037671 A1 | 3/2014 |
| WO | WO 2014/057200 A1 | 4/2014 |
| WO | WO 2014/060338 A1 | 4/2014 |
| WO | WO 2015/052655 A1 | 4/2015 |
| WO | WO 2015/079186 A1 | 6/2015 |

OTHER PUBLICATIONS

U.S. Appl. No. 61/887,687, filed Oct. 7, 2013.
International Patent Application No. PCT/EP2011/068667; Int'l Search Report; dated Jun. 1, 2012; 5 pages.
International Patent Application No. PCT/EP2011/068667; Int'l Preliminary Report on Patentability; dated Apr. 30, 2013; 12 pages.
International Patent Application No. PCT/DE2005/002068; Int'l Preliminary Report on Patentability; dated May 22, 2007; 5 pages.
Bauer D.R.; "Application of Failure Models for Predicting Weatherability in Automotive Coatings"; American Chemical Society; Chapter 24; 1999; p. 378-395.
Anand et al.; "Role of adhesives in the dimensional stability of polycarbonate structural panels"; Int'l Journal of Adhesion & Adhesives; vol. 27; 2007; p. 338-350.
International Patent Application No. PCT/IB2016/055338; Int'l Search Report and the Written Opinion; dated Nov. 25, 2016; 15 pages.
International Patent Application No. PCT/IB2016/055338; Int'l Preliminary Report on Patentability; dated Mar. 22, 2018; 10 pages.
International Patent Application No. PCT/IB2016/055334; Int'l Written Opinion and the Search Report; dated Nov. 22, 2016; 10 pages.
International Patent Application No. PCT/IB2016/055334; Int'l Preliminary Report on Patentability; dated Mar. 22, 2018; 7 pages.
International Patent Application No. PCT/IB2016/055333; Int'l Written Opinion and the Search Report; dated Jan. 2, 2017; 11 pages.
International Patent Application No. PCT/IB2016/055333; Int'l Preliminary Report on Patentability; dated Mar. 22, 2018; 7 pages.
International Patent Application No. PCT/IB2016/055332; Int'l Search Report and the Written Opinion; dated Jan. 2, 2017; 12 pages.
International Patent Application No. PCT/IB2016/055332; Int'l Preliminary Report on Patentability; dated Mar. 22, 2018; 8 pages.

* cited by examiner

MOLDING OF PLASTIC GLAZING OF TAILGATES

RELATED APPLICATION

This application is the National Stage of International Application No. PCT/IB2016/055334 filed Sep. 7, 2016, which claims the benefit of U.S. Provisional Application No. 62/215,084 filed Sep. 7, 2015, the disclosures of which are incorporated herein by this reference in their entireties.

BACKGROUND

Technical Field

The present disclosure relates to tailgates and, specifically, to methods of molding plastic glazing of tailgates.

Technical Background

Vehicles such as sports utility vehicles ("SUVs"), vans, hatchbacks, and the like include a structural component known as a tailgate. The tailgate is provided to open or close an opening formed at a rear portion of a vehicle. The tailgate is typically hinged to the main vehicle body, for example, along its upper end, such that it can swing open and close. Examples of tailgates include a rear door tailgate or a truck lid tailgate.

The tailgate may support one or more other vehicle components, such as a rear glass window and one or more light assemblies (e.g., a supplemental brake light, a puddle light). The tailgate may also be adjacent to body cavities into which rear lamp units are inserted. These parts and other parts may add to the cost and complexity of assembling a vehicle.

Light assemblies in vehicles, in particular, comprise a large number of separate components. For example, a typical vehicle may have several different types of lights, including, for example, parking lights, turn indicator lights, brake lights, and the like. Each of these lights may be made from many parts. These parts add to the cost and complexity of assembling a vehicle. Accordingly, as recognized in U.S. Pat. No. 7,048,423 ("the '423 Patent"), it desirable to have a lighting assembly with fewer parts. The '423 Patent discloses an integrated light assembly including a plurality of lamps 210, 216 enclosed in a housing 202, which may serve as a lens for the lamps, and mounted on a substrate 204. Because the lamps 210, 216 share a common substrate and lens, the additional cost of having a separate lamp unit is eliminated. This structure disclosed in the '423 Patent, however, has many drawbacks. For one, because multiple lamps are mounted together in a single housing without sidewalls or reflectors for directing the angle of their light, the structure does not account for haziness issues. Moreover, if two lights of varying color are mounted in the housing, the structure disclosed in the '423 Patent does not have a way of preventing color overlap. These drawbacks may limit the use of such a light assembly in a vehicle under state and federal regulations governing vehicle lighting requirements. Thus, while the '423 Patent discloses an integrated part for a vehicle, its application may be limited.

Inhomogeneities such as seams and openings between separate vehicle components may also add to the cost of assembling, sealing and/or insulating an interior of the vehicle and/or its components. Moreover such seams and openings may cause aerodynamic inefficiencies and disturb the vehicle's overall aesthetical appearance. Additional components may also be required to connect separate vehicle components to one another, which may add to the overall weight of a vehicle.

Moreover, the assembly of a vehicle may be very labor intensive. A dedicated labor force investing a large number of hours may be required to ensure the proper placement of separate vehicle components with respect to others. Having many separate components may also lead to quality assurance concerns and other performance issues. Accordingly, it may be desirable to have a faster and less labor-intensive method of assembling a vehicle.

The present disclosure aims to solve these problems and other problems in the prior art.

SUMMARY

In accordance with the purpose(s) of the invention, as embodied and broadly described herein, this disclosure, in one aspect, relates to vehicle components, including tailgates, and to methods of molding plastic glazing of tailgates.

As will be apparent from the present disclosure, problems and/or objectives for improvement with respect to a tailgate including plastic glazing, as described herein, may include providing a tailgate that integrates one or more other components of a vehicle, thereby reducing a total number of components of a vehicle and reducing the complexity and cost of assembling a vehicle. Such problems and/or objectives for improvement also may include providing a tailgate that reduces a number of inhomogeneities, seams, and other disruptions, interruptions, and gaps along a surface of a vehicle, thereby increasing an aesthetic appearance of the vehicle and increasing aerodynamic performance. Such problems and/or objectives for improvement further may include providing a tailgate that conceals one or more other features of a vehicle, such as, for example, a light assembly or unit, thereby increasing an aesthetic appearance of the vehicle.

Problems and/or objectives for improvement with respect to a tailgate, as described herein, may also include an efficient method of manufacturing a tailgate including the above improvements. As noted above, the assembly of a vehicle may be very labor intensive, which not only adds to the costs of assembly but may also create quality and performance concerns.

Accordingly, aspects of the present disclosure provide a method of manufacturing a plastic glazing of a tailgate of a vehicle, the method comprising: injecting a first material into a molding apparatus to form a first component of the plastic glazing, wherein the first component comprises a panel of the plastic glazing; injecting a second material into the molding apparatus to form a second component of the plastic glazing, wherein the second component combines with at least the first component, wherein at least a portion of the first component and the second component comprises a translucent cover of a molded light assembly; and injecting a third material into the molding apparatus to form a third component, wherein the third component combines with at least the first component. Such a method of manufacture may reduce labor costs due to its automatic operation and lead to faster production.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The foregoing summary, as well as the following detailed description, is better understood when read in conjunction with the appended drawings. There is shown in the drawings example embodiments, and the present invention is not intended to be limited to the specific embodiments and methods disclosed.

DESCRIPTION

Figure 1:
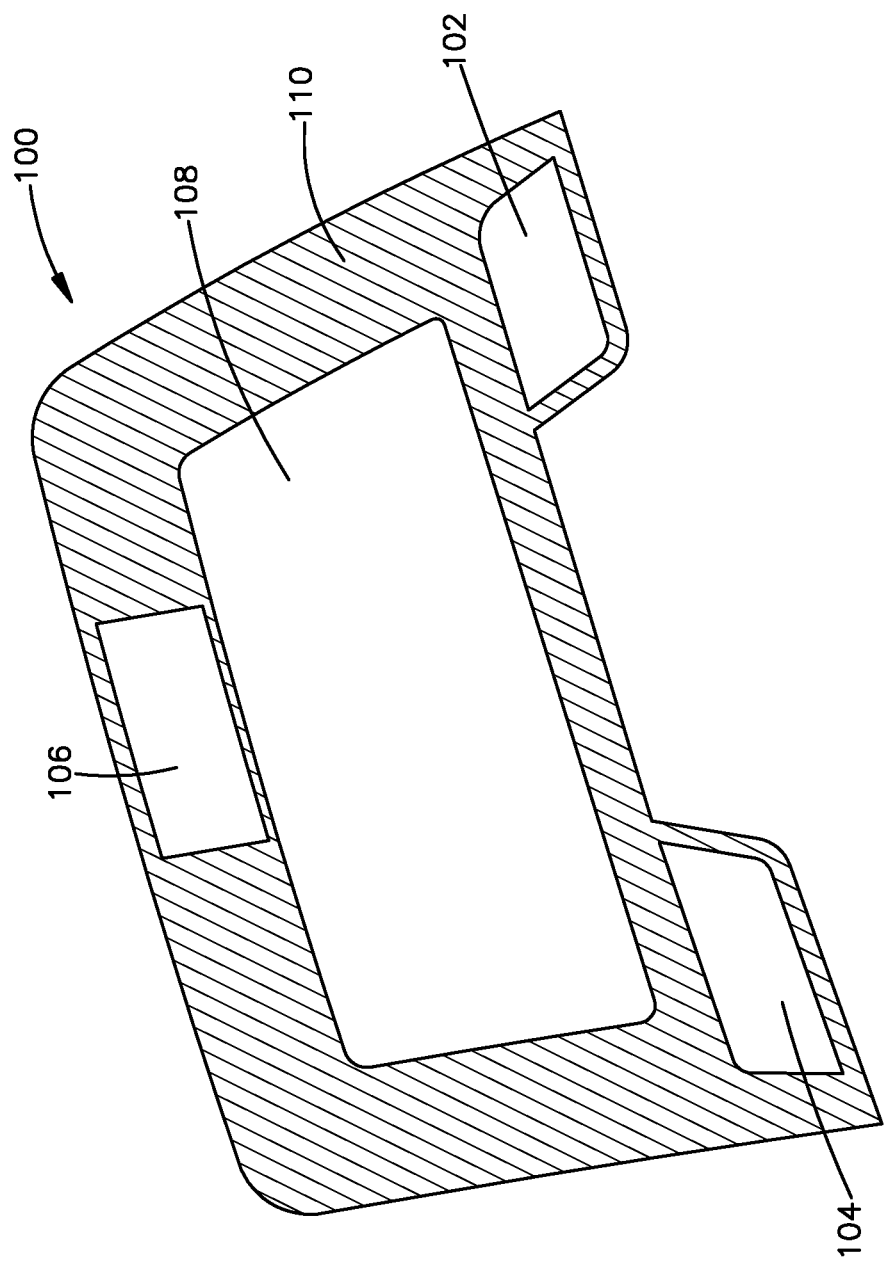
FIG. 1 is a schematic view of a front of a first exemplary plastic glazing of a tailgate in accordance with an embodiment of the present disclosure.

Aspects of the disclosure will now be described in detail with reference to the drawings, wherein like reference numerals designate identical or corresponding parts throughout the several views, unless specified otherwise.

Systems and methods disclosed herein provide a tailgate or lift gate and, in particular, a tailgate having a plastic glazing having a one-piece monolithic construction. The one-piece monolithic structure can be fabricated in one piece using an injection molding process. Vehicles of a hatchback or van configuration typically include an access opening at their rear and a tailgate that selectively opens and closes the access opening. The tailgate may be mounted on the main body of the vehicle using a hinged connection. As such, the tailgate may operate like a hinged flap, which swings open and close along the hinged connection. The tailgate is typically operated manually but may also be operated electronically using a power actuator.

The tailgate may support one or more other vehicle components such as a rear window, a logo or marking, a light assembly or unit, a license plate holder, etc. These components are usually attached to the tailgate using screws or other connectors or an adhesive. In its closed position, the tailgate may also be adjacent to one or more cavities in the body of the vehicle for receiving a rear lamp unit or other light unit.

In order to reduce the number of separate components of a vehicle, systems and methods disclosed herein may provide an integrated tailgate assembly including and/or integrating one or more other vehicle components. For example, systems and methods disclosed herein may provide a tailgate having a plastic glazing including a rear window. The plastic glazing of the tailgate may be constructed of a thermoplastic polymer including a portion that is clear as the rear window. In other systems and methods disclosed herein, additional vehicle components may also be included in the plastic glazing. Such components may include, for example, a colored translucent portion for a rear light unit; an additional translucent portion for a courtesy light, a license plate light, or other light unit; a cavity and fixation unit (e.g., a threaded hole, a hook or clip) for supporting a light unit; a cavity and fixation unit for supporting a license plate; a textured and/or raised region for a logo or other marking; a spoiler or other aerodynamic feature; an opening that serves as a ventilation opening; and the like.

Systems and methods disclosed herein may also provide a tailgate that reduces a number of inhomogeneities, seams, and other disruptions, interruptions, and gaps along a surface of a vehicle, thereby increasing an aesthetic appearance of the vehicle and increasing aerodynamic performance. Systems and methods disclosed herein further may provide a tailgate that conceals one or more other features of a vehicle, such as, for example, a light unit, thereby increasing an aesthetic appearance of the vehicle.

Systems and methods disclosed herein may also provide a method of manufacturing a tailgate or, specifically, a plastic glazing of a tailgate. Such systems and methods may provide a method of producing a plastic glazing using multi-shot injection molding techniques. For example, in certain aspects of the disclosure, a plastic glazing of a tailgate may be formed via a three-shot injection molding process. In a first shot, a clear thermoplastic polymer may be injected to form a shell or outline of the plastic glazing. In a second shot, a colored thermoplastic polymer may be injected to form one or more colored regions in the plastic glazing. For example, a red thermoplastic polymer may be injected to form a red translucent region to serve as the lens for a rear light of a vehicle.

The multi-shot molding techniques may use a mold cavity that can be altered between different volumes in order to accommodate different shots of the molding process. The mold cavity initially may be positioned to have a first volume for receiving a first material. Once the first material is injected and curing, the mold cavity may be adjusted to have a second volume for receiving a second material. This process may be repeated for receiving additional shots of material. The mold cavity can be adjusted between its first volume and its second volume and later volumes using a number of different techniques. Such techniques include, for example, the use of a moveable slide, transfer molding, the use of a rotating platen, and the like.

A single nozzle or multiple nozzles may be used for injecting material into the mold cavity. For example, a single nozzle may be used for injecting a first material and a second material into the mold cavity. Alternatively, a first nozzle may be used for injecting a first material into the cavity, and a second nozzle may be used for injecting a second material into the cavity.

Referring now to FIG. 1, an exemplary plastic glazing 100 of a tailgate of a vehicle is depicted. The plastic glazing 100 may be a one-piece monolithic structure formed of one or more thermoplastic polymers. Examples of suitable thermoplastic polymers include: polycarbonate, polyester carbonate, poly methyl methacrylate, and the like. According to a preferred aspect of the disclosure, the plastic glazing 100 may be formed of a polycarbonate. The plastic glazing 100 can have an outer surface that is seamless, i.e., lacking any visual openings, junctions, disruptions, interruptions, gaps, or the like.

The plastic glazing 100 has a first colored portion 102 that functions as a portion of a right tail lamp of the vehicle, and a second colored portion 104 that functions as a portion of a left tail lamp of the vehicle. In particular, the colored portions 102, 104 can function as lenses of the tail lamps of the vehicle. The plastic glazing 100 also has a third portion 106 for an additional light unit such as, for example, an axillary brake light or a courtesy light. The plastic glazing 100 also includes a clear transparent portion 108 that functions as a rear window of the vehicle, and a colored non-transparent portion 110. The colored non-transparent portion may be strategically placed to hide one or more structures positioned behind the plastic glazing 100.

Figure 2:
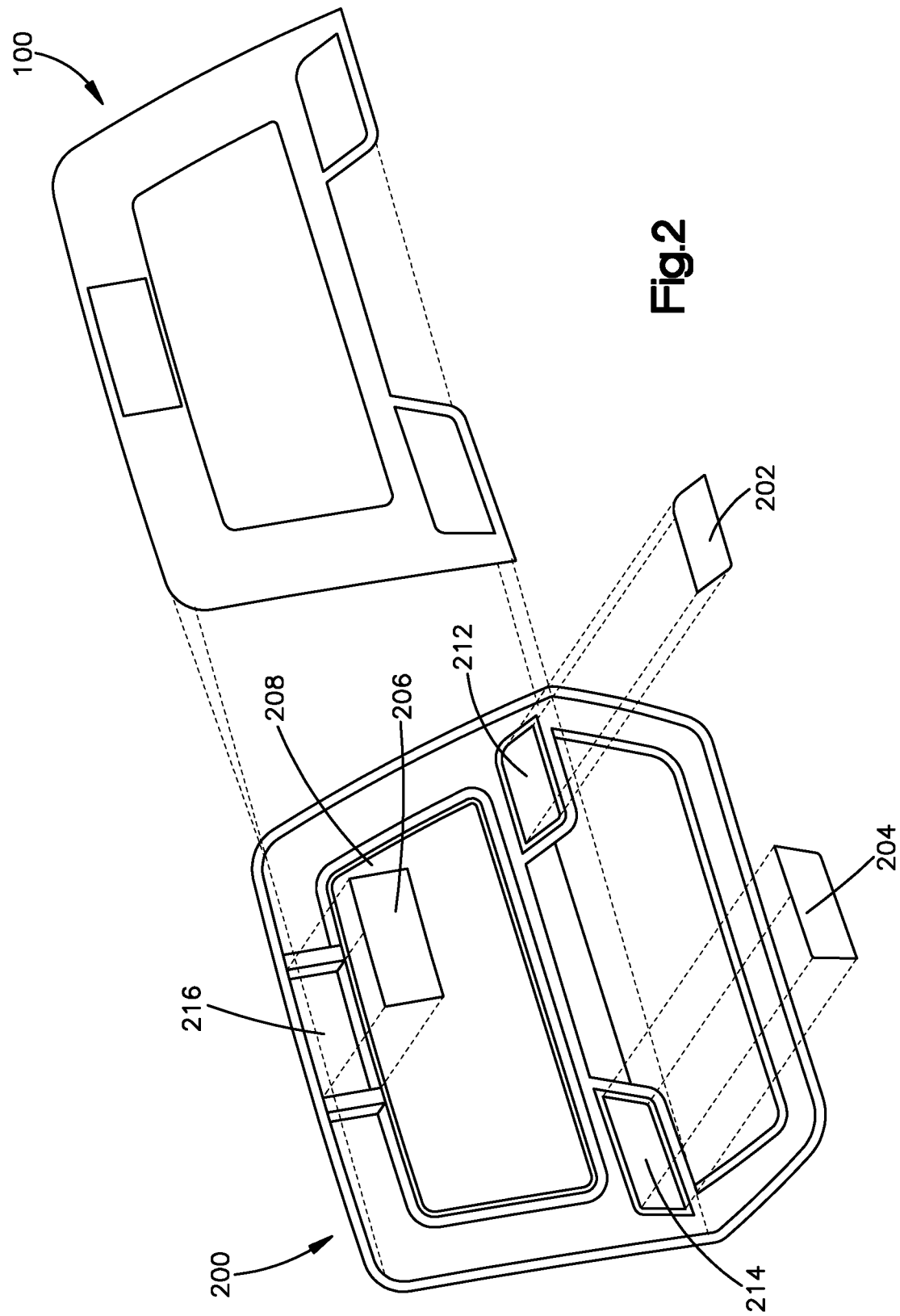
FIG. 2 is a deconstructed view of a tailgate assembly including the first exemplary plastic glazing depicted in FIG. 1 and a housing unit in accordance with an embodiment of the present disclosure.

Referring now to FIG. 2, a housing unit 200 of a tailgate is depicted. The housing unit 200 may be formed of a fiber-reinforced polymer. According to a preferred aspect of the disclosure, the housing unit 200 may be formed of a long-glass fiber-reinforced polypropylene such as, for example, SABIC® STAMAX™ plastic. As depicted in FIG. 2, the housing unit 200 comprises one or more cavities for receiving a light unit. In particular, the housing unit 200 comprises a first cavity 212 for receiving a first light unit 202, a second cavity 214 for receiving a second light unit 204, and a third cavity 216 for receiving a third light unit 206. The light units 202, 204, 206 can be fixed directly onto the housing unit 200 via access doors and/or using mechanical fasteners (e.g., screw, bolt, and the like). The cavities 212, 214, 216 can prevent light from the light units from bleeding outside of a confined space. As such, additional cavities (not depicted) may be formed next to the cavities 212, 214, 216 for holding additional light units, and the cavities would prevent the light generated by one light unit from bleeding into a space reserved for another light unit.

The light units 202, 204, 206 may be a single type of light unit. For example, the light units 202, 204, 206 can be brake light units. Alternatively, the light units 202, 204, 206 may comprise more than one kind of light unit. For example, the light units 202, 204 can be brake light units, and the light unit 206 can be a courtesy light unit.

The plastic glazing 100 may be secured to the housing unit 200 such that the light units 202, 204, 206 are disposed between the plastic glazing 100 and the housing unit 200. In particular, the plastic glazing 100 may be secured to the housing unit 200 such that the light units 202, 204, 206 are disposed behind the portions 102, 104, 106 (depicted in FIG. 1). The light unit 202 may be disposed behind the first colored portion 102, the light unit 204 may be disposed behind the second colored portion 104, and the light unit 206 may be disposed behind the third portion 106.

Light emitted from the light units 202, 204, 206 through the portions 102, 104, 106 of the plastic glazing 100 may be emitted as a colored light in accordance with certain international standards governing vehicle lighting such as, for example, ECE Regulation No. 48 and SAE Standard J578. As noted above, the portions 102, 104 can function as the lens for the vehicle's tail lamps. Accordingly, light emitted from the light units 202, 204 through the portions 102, 104 may be red. ECE Regulation No. 48 defines the color "red" as emitted light with chromaticity coordinates (x,y) that lie within the chromaticity areas defined by the following boundaries in the CIE xyY color space:

| $R_{12}$ | yellow boundary: | y = 0.335 |
|---|---|---|
| $R_{23}$ | the spectral locus | |
| $R_{34}$ | the purple line | |
| $R_{41}$ | purple boundary: | y = 0.980 − x |

With the following (x,y) intersection points:
$R_1$: (0.645, 0.335)
$R_2$: (0.665, 0.335)
$R_3$: (0.735, 0.265)
$R_4$: (0.721, 0.259)

Thus, to fulfill this regulation, the light emitted through the portions 102, 104 may have chromaticity coordinates (x,y) that fall within the chromaticity area defined for the color red in ECE Regulation No. 48, as set forth above.

While the portions 102, 104 and the light units 202, 204 are described herein as producing a red light, one of ordinary skill in the art would appreciate that the portions 102, 104 and the light units 202, 204 may also be designed to produce lights having other colors, such as, for example, yellow or amber. These colors are also defined in ECE Regulation No. 48 as well as in other international standards.

The housing unit 200 also includes an opening 208. When the plastic glazing 100 is secured to the housing unit 200 such that the light units 202, 204, 206 line up with the portions 102, 104, 106, the opening 208 may line up with the clear transparent portion 108 of the plastic glazing 100. By lining up with the clear transparent portion 108, the opening 208 allows an individual's view through the transparent portion 108 (which, as described above, may function as the rear window of the vehicle) to remain unobstructed.

Each of the light units 202, 204, 206 may include one or more light components such as, for example, an incandescent lamp, an electroluminescent lamp, a gas discharge lamp, and the like. Because the light units 202, 204, 206 are secured directly onto the housing unit 200, a separate housing for each light unit 202, 204, 206 may not be needed. Thus, the housing unit 200, which serves as the structural carrier for the plastic glazing 100 of the tailgate, integrates a housing function of a light unit. Moreover, because the portions 102, 104, 106 may function as the lens of a light unit—i.e., the portion 102 may function as the lens for the light unit 202, the portion 104 may function as the lens for the light unit 204, and the portion 106 may function as the lens for the light unit 206—a separate lens for each light units 202, 204, 206 also may not be needed.

The plastic glazing 100 may be secured to the housing unit 200 using an adhesive and/or a mechanical fastening system (e.g., a screw bolt or clip fastening system). The adhesive used may be a commercially available adhesive that is typically used in the automotive industry for the adhesive bonding of plastic components. Such adhesives may include, for example, wet adhesives, contact adhesives, hot-melt adhesives, or reaction adhesives. The thickness of the adhesive required may vary depending on the specific geometries of the plastic glazing 100 and the housing unit 200. When the adhesive is a hot-melt adhesive that can be processed under thermoplastic conditions, it may be possible to bond the plastic glazing 100, the housing unit 200, and the hot-melt adhesive together during a multi-shot injection molding process.

While the tailgate including the plastic glazing 100 and the housing unit 200 is depicted as having three light units 202, 204, 206, one of ordinary skill in the art would appreciate that the tailgate can comprise less or more light units. Such light units may include, for example, license plate lamps, turn signal lamps, backup lamps, and the like.

Figure 3:
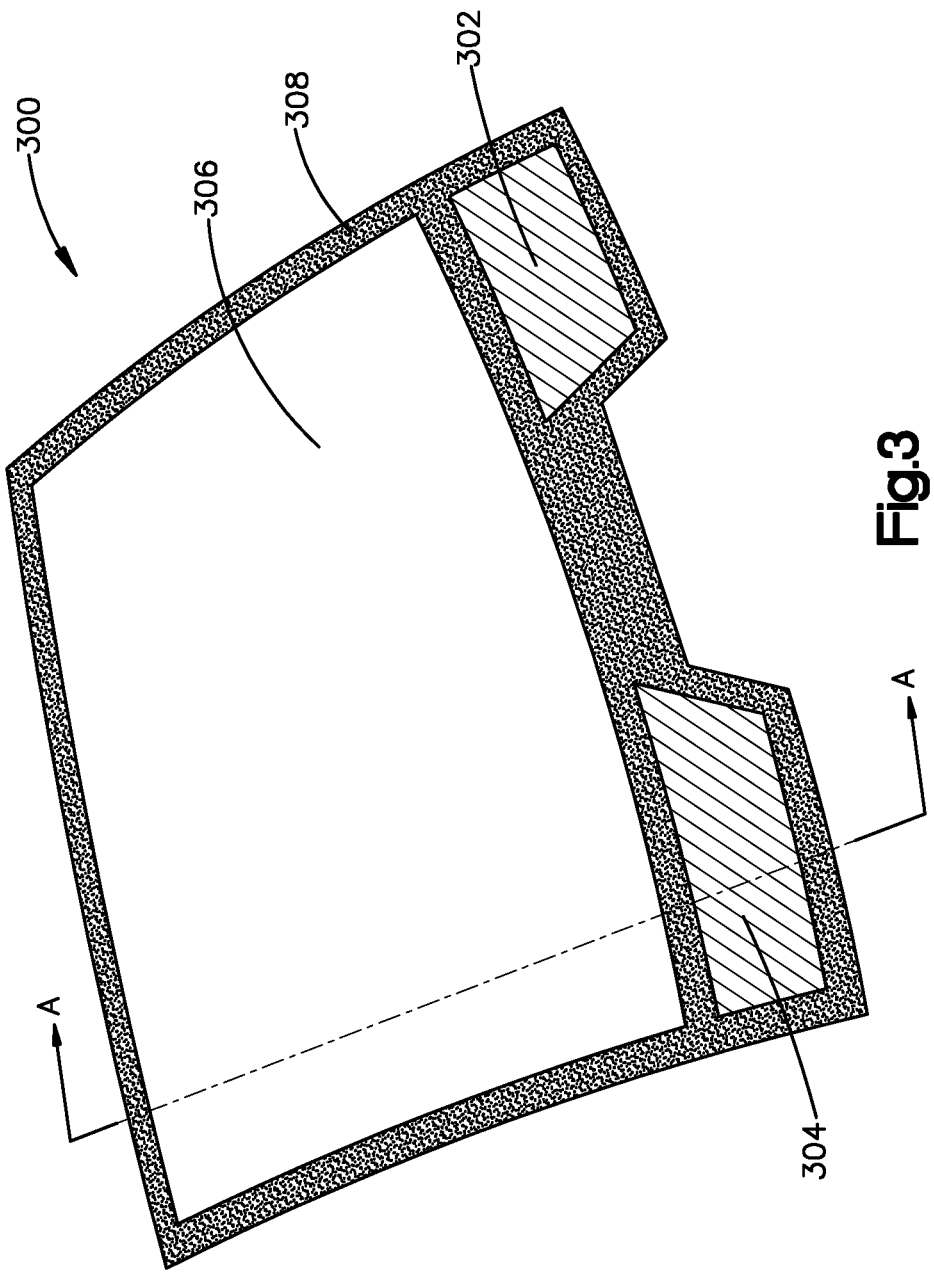
FIG. 3 is a schematic view of a front of a second exemplary plastic glazing of a tailgate in accordance with an embodiment of the present disclosure.

Referring now to FIG. 3, an exemplary plastic glazing 300 of a tailgate is depicted. Similar to the plastic glazing 100 depicted in FIG. 1, the plastic glazing 300 may be a one-piece monolithic structure formed of one or more thermoplastic polymers. The plastic glazing 300 has two colored portions 302, 304 that function as portions of tail lamps of the vehicle or, specifically, the lens of the tail lamps. The plastic glazing 300 also includes a clear transparent portion 306 that functions as a rear window of the vehicle, and a non-transparent portion 308. The non-transparent portion 308 may be black or be another color and/or effect. The non-transparent portion 308 can form an outline around the clear transparent portion 306, thereby outlining the rear window of the vehicle.

Figure 4:
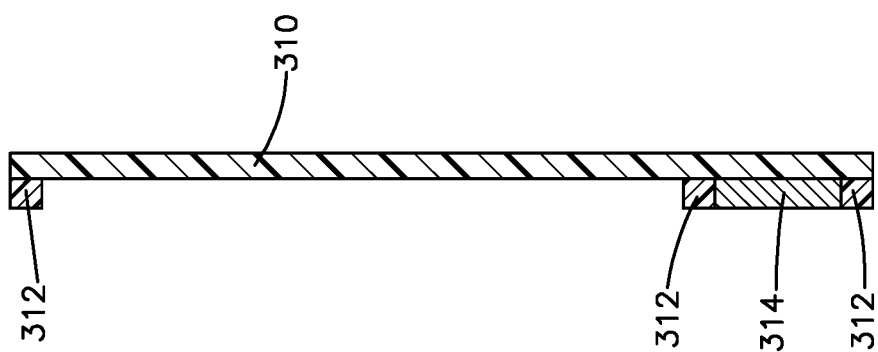
FIG. 4 is a cross-sectional view of the second exemplary plastic glazing depicted in FIG. 3.

FIG. 4 depicts a cross-sectional view of the plastic glazing 300 along the line A-A. As depicted in FIG. 4, the plastic glazing 300 may comprise multiple thermoplastic polymers. The plastic glazing 300 may comprise a clear transparent component 310, a dark component 312 for forming dark edges or blackout (e.g., opaque or substantially opaque regions), and a colored component 314. Each component can be formed by a different thermoplastic polymer such as, for example, different colored polycarbonate resins. The transparent component 310 may be formed of a clear thermoplastic polymer to provide a clear unobstructed view there through. In certain aspects, the transparent component 310 may comprise a certain degree of color but nonetheless retain sufficient transparency to allow a high degree of light transmittance. For example, the transparent component 310 may comprise a tint, such as a grey, green, or brown tint. The dark component 312 may be a black or other colored non-transparent thermoplastic polymer that is configured to control light transmission through the transparent component 310. In particular, the dark component 312 may be optimally positioned on the plastic glazing 300 to conceal one or more vehicle components disposed behind the plastic glazing 300 such as, for example, a housing unit.

The transparent component 310 can be in a first layer, and the dark component 312 and the colored component 314 can be in a second layer separate from the first. The transparent component 310, the dark component 312, and the colored component 314 can have the same thickness or different thicknesses. In an aspect of the disclosure, the transparent component 310 can have a thickness that is greater than that of the dark component 312 and the colored component 314. The transparent component 310 can have a greater thickness in order to provide structural strength to the plastic glazing 300. In another aspect of the disclosure, the thickness of the dark component 312 can be increased in order to provide structural support to an outer panel of the plastic glazing 300 along which the dark component 312 is disposed.

The transparent component 310 may define a panel or overall shell of the plastic glazing 300. The dark component 312 and the colored component 314 may be disposed behind the transparent component 310 towards an interior of a vehicle. By being disposed behind the transparent component 310, the dark component 312 and the colored component 314 may be protected from weathering effects. Moreover, the dark component 312 and the colored component 314 would not create any inhomogeneities or raised portions on a surface of the vehicle.

A first portion of the clear transparent component 310 that does not overlap the dark component 312 and the colored component 314 in the longitudinal direction (i.e., a direction along the line A-A) may form the transparent portion 306 that functions as the rear window of the vehicle. The colored component 314 and a second portion of the clear transparent component 310 that overlaps the colored component 314 in the longitudinal direction may form the colored portion 304 that functions as a lens of a tail lamp unit. And the dark component 312 and additional portions of the clear transparent component 310 that overlap the dark component 312 in the longitudinal direction may form the non-transparent portion 308.

The plastic glazing 300 may be manufactured or produced using an injection molding technique. In particular, the plastic glazing 300 may be produced using a three-shot injection molding technique. The three-shot injection molding technique may use a mold cavity that can be altered between different volumes. The mold cavity can be an example of a molding apparatus. The mold cavity can be set to a first volume for receiving a first shot of material. The first shot of material may form the transparent component 310. Accordingly, the mold cavity can be set to a volume corresponding to that of the transparent component 310. A first material may be injected into the mold cavity to form the transparent component 310. The first material may be a clear, transparent thermoplastic polymer such as, for example, a clear polycarbonate. After the first shot has been injected, the mold cavity may be changed from its first volume into a second volume.

The next shot of material may form the colored component 314. Accordingly, the mold cavity can be set to a volume corresponding to that of the colored component 314. A second material may be injected into the mold cavity to form the colored component 314. The second material may be a similar type of material as the first material so that heat released by the second material along the edge of the first material may melt and fuse (i.e., combine) the colored component 314 to the clear transparent component 310. As such, if the first material is a clear polycarbonate, the second material may be a colored polycarbonate, such as, for example, a red polycarbonate. Such a fusing process may comprise a polymerization where a molecules of the first material and molecules of the second material react together to form polymer chains. After the second shot has been injected, the mold cavity can be changed from its second volume to a third volume. The third and final shot of material may form the dark component 312. Accordingly, the mold cavity can be set to a volume corresponding to that of the dark component 312. Such may involve taking into account the portion of the cavity already filled by the first and second shots. A third material may be injected into the mold cavity to form the dark component 312. The third material also may be a similar type of material as the first and second materials such that heat released by the third material along the end of the first and second materials may melt and fuse the other components to the dark component 312. After the third shot, the entire molded assembly may be left to cool.

According to certain aspects of the disclosure, the order of the second shot and the third shot may be changed. Thus, instead of injecting the second material to form the colored component 314 in the second shot, the third material for forming the dark component 312 may be injected during the second shot. In such aspects, the mold cavity may be adjusted first to a volume corresponding to the dark component 312 and then to a volume corresponding to the colored component 314.

The mold cavity may be altered from a first volume to a second volume, and so on and so forth, using a number of different techniques. According to a preferred aspect of the disclosure, the mold cavity may also be altered using a rotating platen. The rotating platen may be attached to a core plate which has one or more cores mirrored across a centerline of the platen coinciding with the axis of rotation. The core plate may cooperate with a cavity plate to form one or more mold cavities. The cavity plate may have a plurality of cavities with differing geometries. During a multi-shot molding process, the rotating platen may be rotated to move the cores such that they are positioned across from the different cavities. The rotating platen may be rotated by a hydraulic motor or cylinder, or a mechanical means, or the like. To prepare for a first shot, the rotating platen may position a core across from a first cavity, and the mold may close to seal the cavity. A first shot of material may be injected into the first cavity. The mold can then open, and the rotating platen may rotate to position the core across from a second cavity. The mold can close to seal the second cavity, and a second shot of material may be injected into the second cavity. The mold can open again, and the rotating platen may rotate an additional time to position the core across from a third cavity. The mold can close again, and a third shot of material may be injected into the third cavity. This injection mold technique is preferred because it permits parallel injections, where a first core disposed across from a first cavity may receive a first shot of material while a second core disposed across from a second cavity may receive a second shot of material (having already received its first shot of material during an earlier rotation).

While the rotating platen technique is preferred, one of ordinary skill in the art would appreciate that other injection molding techniques may also be used to manufacture the plastic glazing 300. For example, according to another aspect of the disclosure, the mold cavity may be defined by a series of mold dies. Two mold dies may be selected from a group of mold dies to define a mold cavity having a first volume. Each mold die may form a side of the mold cavity. A first shot of material may be injected into the space between the two mold dies and allowed to briefly cool. One of the mold dies may then be removed and a different mold die may be applied to the side from which that mold die was removed. The different mold die with the remaining mold die may define a second volume. A second shot of material may then be injected and allowed to briefly cool. One of the mold dies may again be removed and a different mold die may be applied to the side from which that mold die was removed. This final mold die with the remaining mold die may define a third and final volume. A third shot of material may then be injected into the space between the two mold dies.

Moreover, while these techniques are described assuming a three-shot process, one of ordinary skill in the art would recognize that more than three shots of material may be used to form a plastic glazing, and that such a technique may be implemented with a mold cavity that can be altered into any desirable number of volumes that are needed to form the component.

Figure 5:
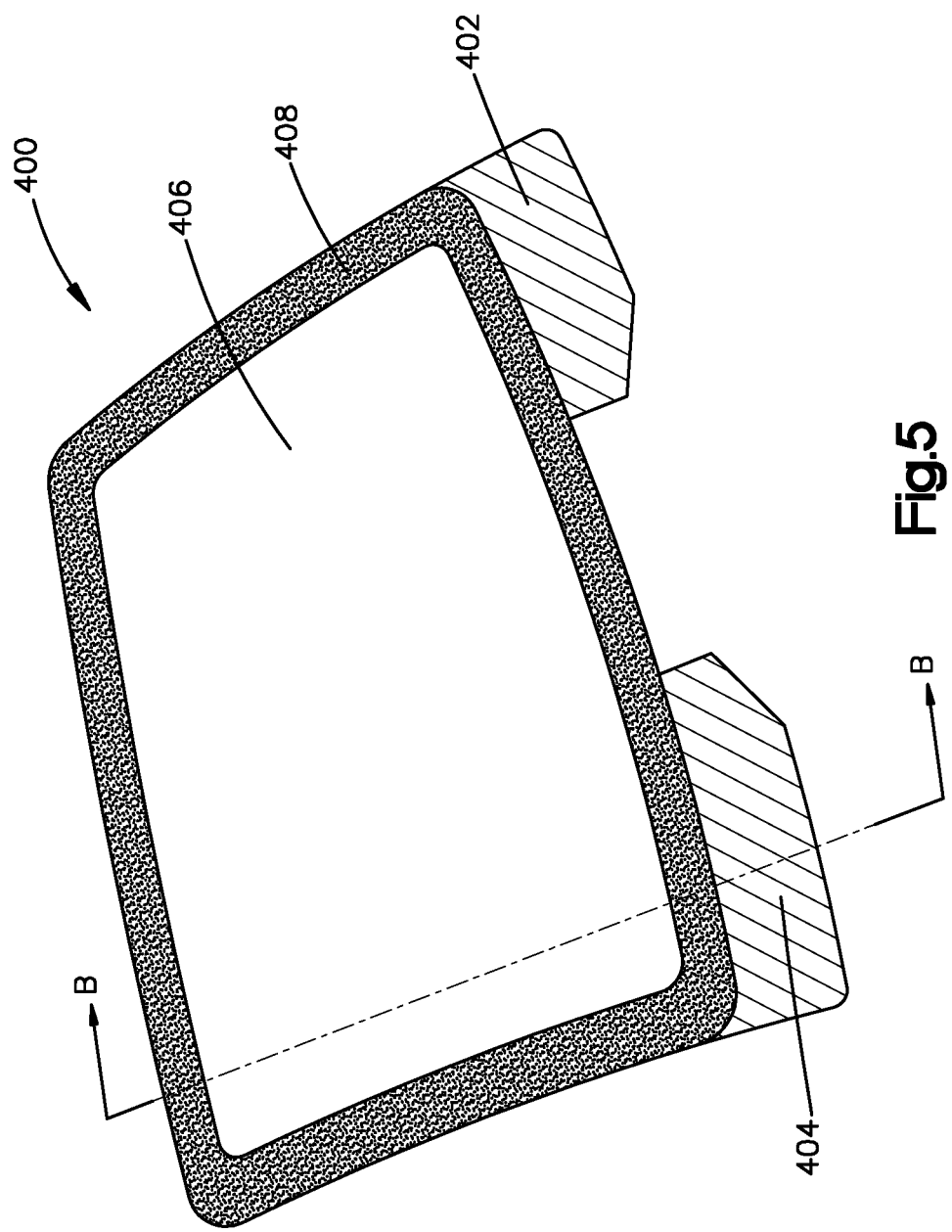
FIG. 5 is a schematic view of a front of a third exemplary plastic glazing of a tailgate in accordance with an embodiment of the present disclosure.

Referring now to FIG. 5, an exemplary plastic glazing 400 of a tailgate is depicted. The plastic glazing 400 may be a one-piece monolithic structure formed of one or more thermoplastic polymers. The plastic glazing 400 has two colored portions 402, 404 that function as portions of tail lamps of the vehicle or, specifically, the lens of the tail lamps. The plastic glazing 400 also includes a clear transparent portion 406 that functions as a rear window of the vehicle, and a non-transparent portion 408. The non-transparent portion 408 may match an exterior color of the vehicle.

Figure 6:
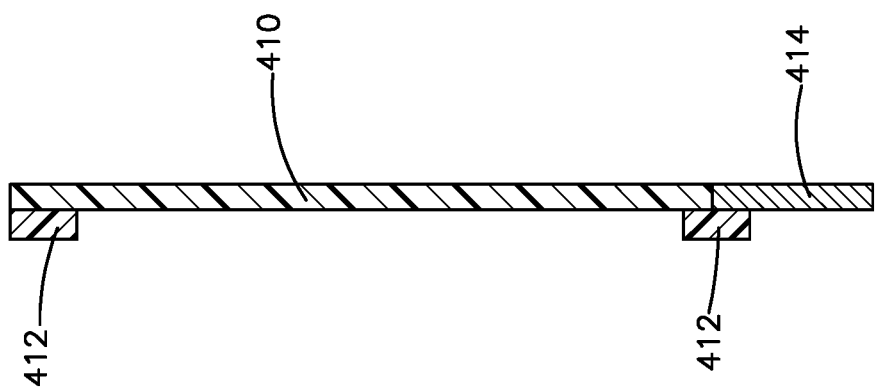
FIG. 6 is a cross-sectional view of the third exemplary plastic glazing depicted in FIG. 5.

FIG. 6 depicts a cross-sectional view of the plastic glazing 400 along the line B-B. As depicted in FIG. 6, the plastic glazing 400 may comprise a translucent component 410, a dark component 412 for forming dark edges or blackout, and a colored component 414. Each component may be formed for a different thermoplastic polymer such as, for example, different colored polycarbonate resins.

The translucent component 410 can comprise a certain degree of color. In certain aspects, the translucent component 410 can comprise a tint, such as a grey, green, or brown tint.

The translucent component 410 and the colored component 414 can be in a first layer, and the dark component 412 can be in a second layer separate from the first. The translucent component 410, the dark component 412, and the colored component 414 may have the same thickness or different thicknesses. According to an aspect of the disclosure, the translucent component 410 and the colored component 414 can have the same thickness, while the dark component 412 can have a thickness that is smaller or greater than that of the translucent component 410 and the colored component 414. The dark component 412 can be disposed behind the translucent component 410 and the colored component 414 towards an interior of a vehicle. Such would minimize any inhomogeneities along an exterior surface of the vehicle.

A first portion of the translucent component 410 that does not overlap the dark component 412 in the longitudinal direction (i.e., a direction along the line A-A) may form the transparent portion 406 that functions as the rear window of the vehicle. A portion of the colored component 414 that does not overlap the dark component 412 in the longitudinal direction may form the colored portion 404 that functions as a lens of a tail lamp unit. And the dark component 412 and additional portions of the translucent component 410 and the colored component 414 that overlap the dark component 412 in the longitudinal direction may form the non-transparent portion 408.

Similar to the plastic glazing 300 of FIG. 3, the plastic glazing 400 depicted in FIG. 5 may be manufactured or produced using an injection molding technique. In particular, the plastic glazing 300 may be produced using a three-shot injection molding method, such as those described above with respect to the plastic glazing 300. In order to combine or bond the dark component 412 to the translucent component 410 and the colored component 414, the dark component 412 may be injected after the translucent component 410 and the colored component 414. Additionally, it is preferred that each of the translucent component 410, the dark component 412, and the colored component 414 comprise a similar thermoplastic polymer in order to facilitate bonding of the various components during the injection molding process. In a preferred aspect of the disclosure, all three components may be polycarbonate resins.

Moreover, it is preferred that the translucent component 410 be injected first into the molding apparatus and allowed to cure before injecting the colored component 414 (and the dark component 412) to prevent color in the later injected components from seeping into the translucent component 410.

Figure 7:
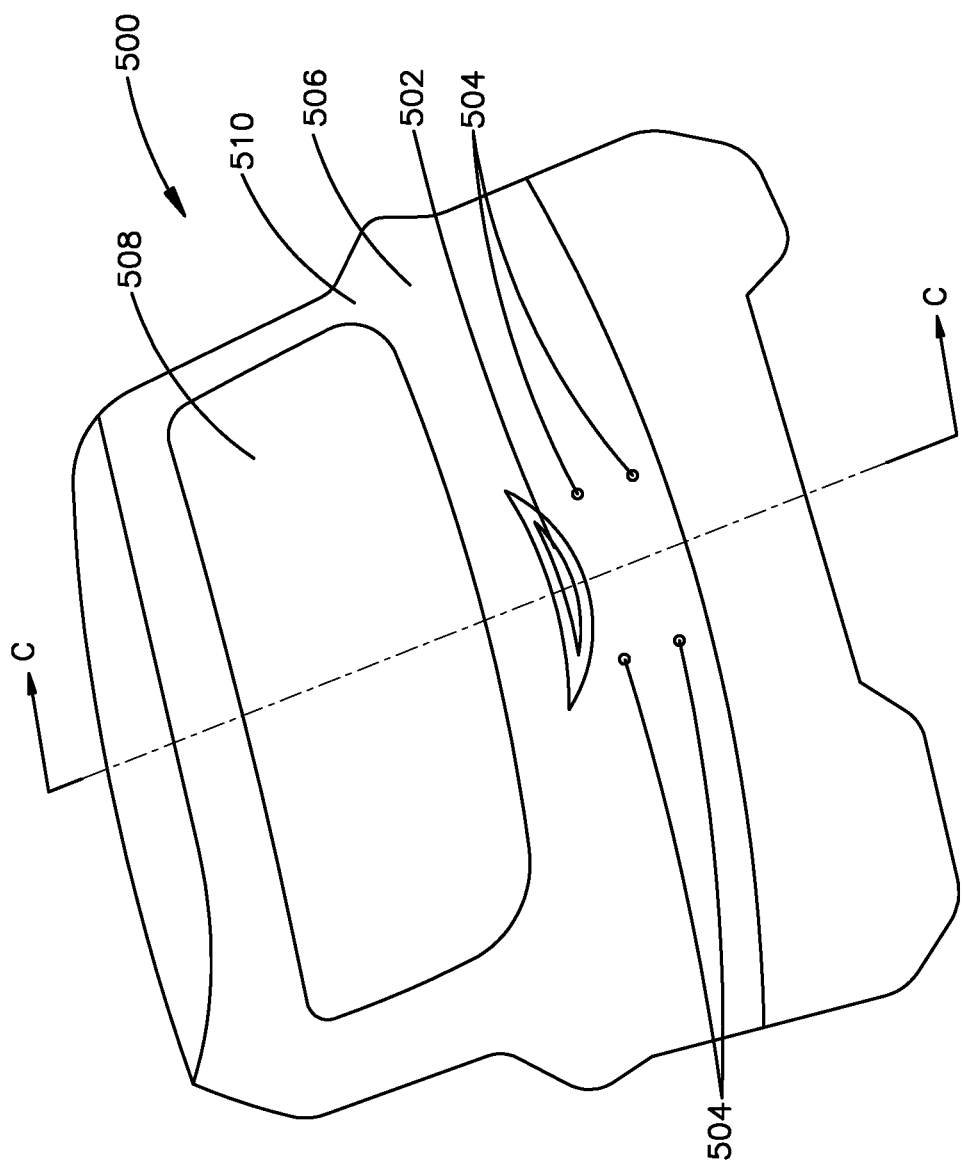
FIG. 7 is a schematic view of a front of a fourth exemplary plastic glazing of a tailgate in accordance with an embodiment of the present disclosure.

Referring now to FIG. 7, an exemplary plastic glazing 500 of a tailgate of a vehicle is depicted. The plastic glazing 500 comprises a main body 506. The main body 506 has a first translucent portion 508 that is transparent that functions as a rear window of the vehicle. The main body 506 also has a second translucent portion 502 and a plurality of fixation mechanisms 504. The second translucent portion 502 can function as a lens for a light unit—in particular, a license plate light unit. The second translucent portion 502 can be positioned above an area on the plastic glazing 500 for receiving a license plate. Because the plastic glazing 500 does not include any seams or breaks along its different components, the light unit behind the second translucent portion 502 may be concealed from the outside until the light unit is turned on.

The fixation mechanisms 504 can be disposed below the second translucent portion 502. The fixation mechanisms 504 may be configured to secure a license plate. In an aspect, the fixation mechanisms 504 may be screw holes for receiving screws. This aspect is described in further detail below with respect to FIGS. 8 and 9. In an alternative aspect, the license plate 602 may be fixed to the plastic glazing 500 using plastic clips. The plastic clips may be designed to snap into a counterpart feature of the plastic glazing 500. These counterpart features may be injection molded into the tailgate. The plastic clips may be broken off and replaced by new clips in order to attach new license plates.

Figure 8:
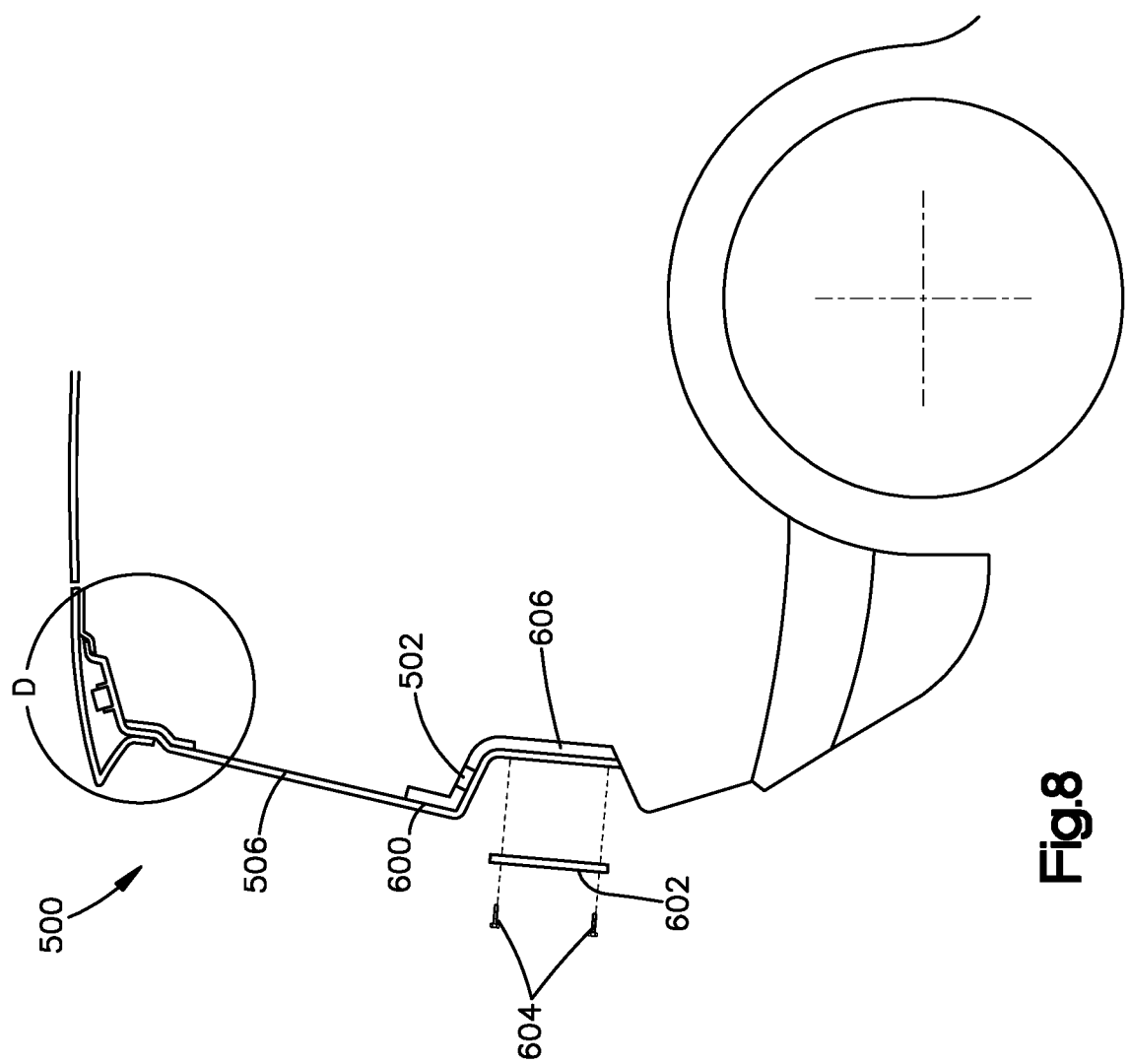
FIG. 8 is a cross-sectional view of a vehicle having the fourth exemplary plastic glazing depicted in FIG. 7.

FIG. 8 depicts a cross-section of the plastic glazing 500 along the line C-C. As depicted in FIG. 8, a license plate 602 may be attached to the plastic glazing 500 using a plurality of screws 604. The plurality of screws 604 may attach the license plate 602 to the plastic glazing 500 by being threaded into the plurality of fixation mechanisms 504.

The main body 506 of the plastic glazing 500 may be formed of a first thermoplastic polymer. The plastic glazing 500 may also have a dark component 606 that is disposed behind the main body 506 towards the interior of the vehicle. The dark component 606 may form a blackout portion of the plastic glazing 500. The dark component 606 may form an outline of a rear window of the vehicle. The dark component 606 may also provide structural support for a panel of the plastic glazing 500.

Similar to the plastic glazing 300 of FIG. 3, the plastic glazing 500 depicted in FIG. 7 may be manufactured or produced using an injection molding technique. In particular, the plastic glazing 500 may be produced using a multi-shot injection molding method, such as those described above with respect to the plastic glazing 500. In a first shot, a clear transparent thermoplastic polymer (e.g., a clear polycarbonate resin) may be injected into a first mold to form the main body 506. As noted above, the main body 506 may have a plurality of fixation mechanisms 504. Accordingly, the mold for the first shot may be shaped to form the plurality of fixation mechanisms 504.

In a second shot, an opaque thermoplastic polymer (e.g., a black polycarbonate resin) may be injected to form the dark component 606. Shots of additional material may also be injected molded to main body 506 and the dark component 606 to achieve various other color schemes or functional purposes.

Figure 9:
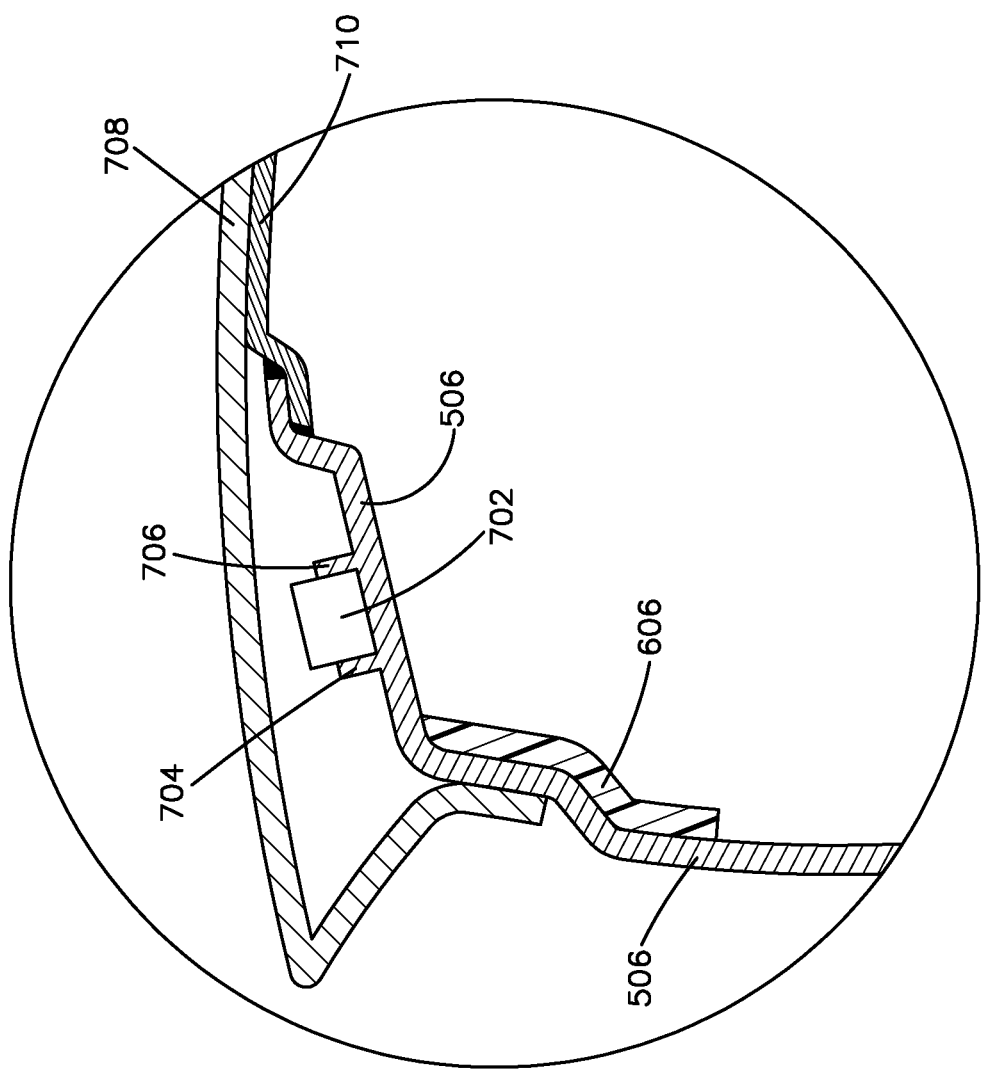
FIG. 9 is an enlarged view of an upper region of the cross-sectional view of the vehicle having the fourth exemplary plastic glazing depicted in FIG. 7.

Referring now to FIG. 9, an enlarged view of an upper region labeled D of the cross-sectional view of the plastic glazing 500 is depicted. As shown in the enlarged view, the main body 506 of the plastic glazing 500 may further comprise fixation mechanisms as represented by numerals 704, 706 for fixing a light unit 702 to the vehicle. The light unit 702 may be an interior light unit that projects light through the main body 506, which may be formed of a clear transparent thermoplastic polymer. The light unit 702 can be secured to the vehicle using any number of known fixation methods. For example, the light unit may be secured to the vehicle by being snapped into place between the two fixation mechanisms 704, 706. The light unit may also be secured to the vehicle using screws, bolts, or other fastening members. Thus, while the fixation mechanisms 704, 706 are depicted in FIG. 9, one of ordinary skill in the art would appreciate that other fixation mechanisms, including industry-standard snap-fits, hooks, etc., may be used.

Additionally, as depicted in FIG. 9, the tailgate including the plastic glazing 500 may further include a spoiler portion 708 and a supporting member 710. The supporting member 710 may be a part of a housing unit (e.g., a STAMAX™ unit) that is disposed behind the plastic glazing 500 for supporting additional light units and the like. The spoiler portion 708 may be formed of an additional thermoplastic polymer and may be attached to the main body 506 using an adhesive or mechanical fastening system.

According to certain aspects of the disclosure, the tailgate assembles disclosed herein may also include additional layers on top of the thermoplastic polymer layers. For example, a layer for increasing scratch resistance may be added to an exterior surface of the plastic glazing. As another example, an additional layer for adding more support to the thermoplastic polymer layers may also be added to an interior surface of the plastic glazing. This additional layer may be formed of a plastic, a metal, or other material for increasing the structural strength of the tailgate.

It will be appreciated that the present disclosure may include any one and up to all of the following examples.

Example 1

A method of manufacturing a plastic glazing of a tailgate of a vehicle, the method comprising: injecting a first material into a molding apparatus to form a first component of the plastic glazing, wherein the first component comprises a panel of the plastic glazing; injecting a second material into the molding apparatus to form a second component of the plastic glazing, wherein the second component combines with at least the first component, wherein at least a portion of the first component and the second component comprises a translucent cover of a light unit; and injecting a third material into the molding apparatus to form a third component, wherein the third component combines with at least the first component.

Example 2

The method of Example 1, wherein the first material is a thermoplastic polymer.

Example 3

The method of Example 1, wherein the second material is a thermoplastic polymer.

Example 4

The method of Example 1, wherein the third material is a thermoplastic polymer.

Example 5

The method of Example 1, wherein each of the first material, the second material, and the third material is a thermoplastic polymer.

Example 6

The method of any of Examples 2-5, wherein the thermoplastic polymer comprises one or more of: acrylatel; acrylonitrile butadiene styrene; acrylonitrile styrene; polybutylene terephthalate; polycarbonate; polyethylene; polyethylene terephthalate; polyoxymethylene; polypropylene; polyurethane; and poly-vinyl-chloride.

Example 7

The method of any of Examples 1-6, wherein the light unit is a tail lamp.

Example 8

The method of any of Examples 1-6, wherein the light unit is an interior light.

Example 9

The method of any of Examples 1-6, wherein the light unit is a license plate light.

Example 10

The method of any of Examples 1-6, wherein the light unit is a puddle light.

Example 11

The method of any of Examples 1-6, wherein the light unit is a turn signal light.

Example 12

The method of any of Examples 1-11, wherein the translucent cover of the light unit is configured to emit a colored light.

Example 13

The method of Example 12, wherein the colored light emitted by the translucent cover has a CIE chromaticity coordinate lying within a color space defined by the boundaries in the CIE xyY color space:

| $R_{12}$ | yellow boundary: | $y = 0.335$ |
|---|---|---|
| $R_{23}$ | the spectral locus | |
| $R_{34}$ | the purple line | |
| $R_{41}$ | purple boundary: | $y = 0.980 - x$ |

With the (x,y) intersection points:
 $R_1$: (0.645, 0.335)
 $R_2$: (0.665, 0.335)
 $R_3$: (0.735, 0.265)
 $R_4$: (0.721, 0.259)

Example 14

The method of Example 12, wherein the colored light emitted by the translucent cover has a CIE chromaticity coordinate lying within a color space defined by the boundaries in the CIE xyY color space:

| $A_{12}$ | green boundary: | $y = x - 0.120$ |
|---|---|---|
| $A_{23}$ | the spectral locus | |
| $A_{34}$ | red boundary: | $y = 0.390$ |
| $A_{41}$ | white boundary: | $y = 0.790 - 0.670$ |

With the (x,y) intersection points:
 $A_1$: (0.545, 0.425)
 $A_2$: (0.560, 0.440)
 $A_3$: (0.609, 0.390)
 $A_4$: (0.597, 0.390)

Example 15

The method of any of Examples 1-12, wherein the second component comprises a translucent cover of an additional light unit, and wherein the light unit and the additional light unit are different ones of: a tail lamp, a license plate light, an interior light, a turn signal light, and a puddle light.

Example 16

The method of any of Examples 1-12, wherein at least one of the first component, the second component, and the third component comprises a fixation mechanism.

Example 17

The method of any of Examples 1-12, wherein the first component comprises a fixation mechanism.

Example 18

The method of Example 17, wherein the fixation mechanism is configured to secure a light source of the light unit.

Example 19

The method of Example 17, wherein the fixation mechanism is configured to secure a license plate.

Example 20

The method of any of Examples 1-12, wherein the second material is injected into the molding apparatus after the first material is injected into the molding apparatus and before the third material is injected into the molding apparatus.

Example 21

The method of any of Examples 1-12, wherein the third component comprises a blackout, and wherein the blackout is configured to control a transmission of light through the first component.

Example 22

The method of Example 21, wherein the third material injected to form the third component is injected into the molding apparatus after the first material is injected into the molding apparatus and before the second material is injected into the molding apparatus.

Example 23

The method of any of Examples 1-12, wherein the first component further comprises a rear window.

Example 24

The method of Example 23, wherein the blackout forms an outline of the rear window formed by the first component.

Example 25

The method of any of Examples 1-12, wherein the third component is configured to provide structural support to the panel of the plastic glazing.

Example 26

An apparatus for forming a plastic glazing of a tailgate of a vehicle, wherein the plastic glazing is of one-piece monolithic molded plastic construction, the apparatus comprising: a first cavity for receiving a first material, wherein the first cavity is configured to mold the first material into a first component, wherein the first component comprises a panel of the plastic glazing; a second cavity for receiving a second material, wherein the second cavity is configured to mold the second material into a second component that combines with at least the first component, wherein at least a portion of the first component and the second component comprises a translucent cover of a light unit; and a third cavity for receiving a third material, wherein the third cavity is configured to mold the third material into a third component that combines with at least the first component.

Example 27

The apparatus of Example 26, wherein the first material is a thermoplastic polymer.

Example 28

The apparatus of Example 26, wherein the second material is a thermoplastic polymer.

Example 29

The apparatus of Example 26, wherein the third material is a thermoplastic polymer.

Example 30

The apparatus of Example 26, wherein each of the first material, the second material, and the third material is a thermoplastic polymer.

Example 31

The apparatus of any of Examples 27-30, wherein the thermoplastic polymer comprises one or more of: acrylate; acrylonitrile butadiene styrene; acrylonitrile styrene; polybutylene terephthalate; polycarbonate; polyethylene; polyethylene terephthalate; polyoxymethylene; polypropylene; polyurethane; and poly-vinyl-chloride.

Example 32

The apparatus of any of Examples 26-31, wherein the light unit is a tail lamp.

Example 33

The apparatus of any of Examples 26-31, wherein the light unit is an interior light.

Example 34

The apparatus of any of Examples 26-31, wherein the light unit is a license plate light.

Example 35

The apparatus of any of Examples 26-31, wherein the light unit is a puddle light.

Example 36

The apparatus of any of Examples 26-31, wherein the light unit is a turn signal light.

Example 37

The apparatus of any of Examples 26-36, wherein the translucent cover of the light unit is configured to emit a colored light.

Example 38

The apparatus of Example 37, wherein the colored light emitted by the translucent cover has a CIE chromaticity coordinate lying within a color space defined by the boundaries in the CIE xyY color space:

| | | |
|---|---|---|
| $R_{12}$ | yellow boundary: | $y = 0.335$ |
| $R_{23}$ | the spectral locus | |
| $R_{34}$ | the purple line | |
| $R_{41}$ | purple boundary: | $y = 0.980 - x$ |

With the (x,y) intersection points:
$R_1$: (0.645, 0.335)
$R_2$: (0.665, 0.335)
$R_3$: (0.735, 0.265)
$R_4$: (0.721, 0.259)

Example 39

The apparatus of Example 37, wherein the colored light emitted by the translucent cover has a CIE chromaticity coordinate lying within a color space defined by the boundaries in the CIE xyY color space:

| | | |
|---|---|---|
| $A_{12}$ | green boundary: | $y = x - 0.120$ |
| $A_{23}$ | the spectral locus | |
| $A_{34}$ | red boundary: | $y = 0.390$ |
| $A_{41}$ | white boundary: | $y = 0.790 - 0.670$ |

With the (x,y) intersection points:
$A_1$: (0.545, 0.425)
$A_2$: (0.560, 0.440)
$A_3$: (0.609, 0.390)
$A_4$: (0.597, 0.390)

Example 40

The apparatus of any of Examples 26-37, wherein the second component comprises a translucent cover of an additional light unit, and wherein the light unit and the additional light unit are different ones of: a tail lamp, a license plate light, an interior light, a turn signal light, and a puddle light.

Example 41

The apparatus of any of Examples 26-37, wherein at least one of the first component, the second component, and the third component comprises a fixation mechanism.

Example 42

The apparatus of any of Examples 26-37, wherein the first component comprises a fixation mechanism.

Example 43

The apparatus of Example 41, wherein the fixation mechanism is configured to secure a light source of the light unit.

Example 44

The apparatus of Example 41, wherein the fixation mechanism is configured to secure a license plate.

Example 45

The apparatus of any of Examples 26-37, wherein the third component comprises a blackout, and wherein the blackout is configured to control a transmission of light through the first component.

Example 46

The apparatus of any of Examples 26-37, wherein the first component further comprises a rear window.

Example 47

The apparatus of Example 46, wherein the blackout forms an outline of the rear window formed by the first component.

Example 48

The apparatus of any of Examples 26-37, wherein the third component is configured to provide structural support to the panel of the plastic glazing.

Example 49

The apparatus of Example 26, wherein a portion of the first cavity is formed on a stationary plate.

Example 50

The apparatus of Example 26, wherein a portion of the second cavity is formed on a stationary plate.

Example 51

The apparatus of Example 26, wherein a portion of the third cavity is formed on a stationary plate.

Example 52

The apparatus of Example 26, wherein portions of the first cavity, the second cavity, and the third cavity are formed together on a single stationary plate.

Example 53

The apparatus of Example 52, wherein a corresponding portion of the first cavity, the second cavity, and the third cavity is formed on a rotating plate.

In general, systems and methods disclosed herein may alternately comprise, consist of, or consist essentially of, any appropriate components herein disclosed. The invention may additionally, or alternatively, be designed so as to be devoid, or substantially free, of any components used in the prior art compositions or that are otherwise not necessary to the achievement of the function and/or objectives of the present invention.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Aspects of the present disclosure described in connection with illustrated embodiments have been presented by way of illustration, and the present disclosure is therefore not intended to be limited to the disclosed embodiments. Furthermore, the structure and features of each embodiment described herein can be applied to the other embodiments described herein. Accordingly, those skilled in the art will realize that the present disclosure is intended to encompass all modifications and alternative arrangements included within the spirit and scope of the present disclosure, as set forth by the appended claims.

What is claimed is:

1. A method of manufacturing a plastic glazing of a tailgate of a vehicle, wherein the plastic glazing is of one-piece molded plastic construction, the method comprising:
    (a) forming a first layer using a multi-shot injection molding technique, comprising
        (i) injecting a first material into a first portion of a mold cavity to form a first component of the plastic glazing, wherein the first component comprises a panel of the plastic glazing that is colored,
        (ii) injecting a second material into a second portion of the mold cavity to form a second component of the plastic glazing, wherein the second component combines with at least the first component to form the first layer, wherein both of the first portion and the second portion span an entire width of the first layer, wherein at least a portion of the first component and the second component comprises a translucent cover of a molded light assembly; and
    (b) forming a second layer using the multi-shot injection molding technique that is separate from the first layer, comprising injecting a third material into the mold cavity overlying the first component and the second component to form a third component, wherein the third component directly contacts both the first component and the second component, and wherein the second layer is configured to face towards an interior of the vehicle.

2. The method of claim 1, wherein each of the first material, the second material, and the third material comprises a polycarbonate resin.

3. The method of claim 1, wherein the molded light assembly is a tail lamp.

4. The method of claim 1, wherein the translucent cover of the molded light assembly is configured to emit a colored light.

5. The method of claim 1, wherein at least one of the first component, the second component, and the third component comprises a fixation mechanism.

6. The method of claim 5, wherein the fixation mechanism is configured to secure a light source of the molded light assembly.

7. The method of claim 1, wherein the second material is injected into the mold cavity after the first material is injected into the mold cavity and before the third material is injected into the mold cavity.

8. The method of claim 1, wherein the third component comprises a blackout,
   wherein the blackout is configured to control a transmission of light through the first component.

9. The method of claim 8, wherein the third material injected to form the third component is injected into the mold cavity after the first material is injected into the mold cavity and before the second material is injected into the mold cavity.

* * * * *